May 12, 1936.     H. B. BROWN     2,040,292

THERMOMETER

Filed April 28, 1934

INVENTOR
H. BRAINARD BROWN

BY D. Clyde Jones

ATTORNEY

Patented May 12, 1936

2,040,292

UNITED STATES PATENT OFFICE 2,040,292

THERMOMETER

H. Brainard Brown, Rochester, N. Y., assignor to Taylor Instrument Companies, Rochester, N. Y., a corporation of New York Application April 28, 1934, Serial No. 722,956

2 Claims. (Cl. 73—52)

This invention relates to a thermometer and more particularly to a thermometer of the floating type.

It has been customary in the past to make floating thermometers, such as bath thermometers, with a wood support. In one popular type of such thermometers, the major portion of the thermometer tube is set in a recess in the face of the wooden support, while the remainder of the tube with the bulb thereof projects downwardly through an opening in the support at right angles to its principal axis. Such thermometers are satisfactory in service, but are rather expensive to make and since the stem is partially exposed there is considerable breakage.

In accordance with the present invention a novel type of floating or bath thermometer is provided in which the thermometer tube is mounted in a waterproof chamber of a support which has at least one of its walls made of transparent material.

Another feature of the invention relates to mounting a thermometer tube within a hollow waterproof support, so that the bulb is on contact with an inner wall of the support whereby the heat of the liquid in which the support is floating, passes through the mentioned wall by conduction and thence to the bulb.

A further feature of the invention relates to the mounting of a thermometer tube within a hollow support with the bulb of this tube embedded in heating conducting material in contact with a wall of the support.

Figure 1:
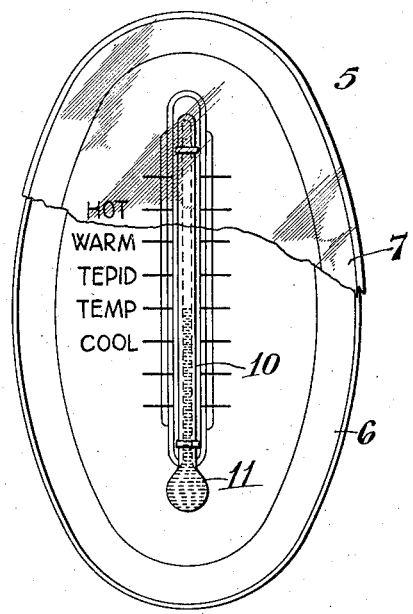
Figure 2:
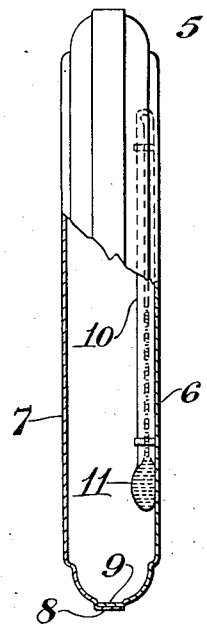
Figure 3:
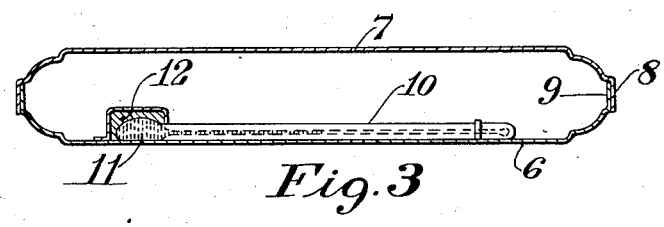

These and other features of the invention will appear from the detailed description and claims when taken with the drawing in which Fig. 1 is a front elevation of the thermometer of this invention with a portion of its front wall broken away; Fig. 2 is a side elevation partially in section of the thermometer of Fig. 1; and Fig. 3 is a cross-section of a modified form of thermometer showing a different arrangement for conducting heat from the inner wall of the support to the thermometer bulb.

Referring especially to Figs. 1 and 2, 5 designates a thermometer support of any desired contour, but as herein shown, it is generally elliptical in outline and has a flattened front and rear face. The support 5 is made preferably of two cup-shaped parts 6 and 7 having their margins 8 and 9 in telescopic relation as shown in Figs. 2 and 3, with the joint between these margins sealed by means of some waterproof adhesive so that no water can enter the air chamber thus formed within the support. While the parts of the support can be made of any suitable material, provided the front face thereof is transparent, it is preferred to use cellulose acetate, although cellulose nitrate can be used with equally good results, except that it is considerably more inflammable than cellulose acetate.

The inner wall of the rear part 6 of the support has mounted thereon in any suitable manner, a thermometer tube including a stem 10 and a related bulb 11 containing any suitable filling medium, such as mercury or colored liquid. The front wall 7 of the support is necessarily transparent, but the rear wall 6 can be transparent or opaque, as is desired. It will be understood that on the inner surface of the rear wall of the support there are provided suitable graduations and legends in proper relation to the thermometer stem. It will be noted in Figs. 2 and 3 that the thermometer bulb 11 is flattened and in contact with the inner surface of the rear wall of the support, so that when the support is floating on the liquid, the heat from this liquid will pass through the lower or rear wall of the support and thence to the bulb.

Under certain conditions it is desirable to provide a more intimate contact between the thermometer bulb and the rear wall of the support than is afforded by surface contact. This result is obtained, as is shown in Fig. 3, by embedding the bulb 11 in a mass of heat conducting material 12 in contact with the rear wall of the support to facilitate the transfer of heat from the support to the bulb 11.

The present disclosure is merely typical of applicant's invention and there may be many variations and modifications thereof within the scope of the appended claims without departing from the spirit of this invention.

I claim:

1. In combination, a sealed hollow elongated support of non-shatterable material, said support having a relatively large flattened surface extending generally parallel to the long axis of said support, and a thermometer tube mounted in said support generally parallel to the plane of said surface and in heat conducting relation therewith, at least a portion of said support being transparent to permit reading of said thermometer therethrough.

2. In combination, a sealed hollow elongated support of non-shatterable material, said support having a relatively large flattened surface extending generally parallel to the long axis of said support, whereby said support will float with said surface in a generally horizontal position, and a thermometer tube mounted in heat-conducting relation with said surface and extending in a direction generally parallel to said long axis, at least a portion of said support being transparent to permit reading of said thermometer tube therethrough.

H. BRAINARD BROWN.